US005887567A

United States Patent [19]

White et al.

[11] Patent Number: 5,887,567

[45] Date of Patent: Mar. 30, 1999

[54] NATURAL GAS FUELING SYSTEM

[76] Inventors: George W. White, 701 Piney Point Rd., Houston, Tex. 77024; Edwin R. Daniel, 8310 S. Briarhollow La., Houston, Tex. 77027; James E. Kirkland, 723 Highgrove Park, Houston, Tex. 77024; James S. Shively, 5261 Memorial Dr., Houston, Tex. 77007

[21] Appl. No.: 731,824

[22] Filed: Oct. 21, 1996

Related U.S. Application Data

[60] Division of Ser. No. 453,154, May 30, 1995, Pat. No. 5,566,712, which is a continuation-in-part of Ser. No. 158, 023, Nov. 26, 1993, Pat. No. 5,441,234.

[51] Int. Cl.[6] .............................. F02B 3/08; F02B 43/02; F02M 21/08

[52] U.S. Cl. .............................. 123/294; 123/527

[58] Field of Search .............................. 123/294, 525, 123/527; 137/587; 62/45.1, 50.1, 50.7, 53.2

[56] References Cited

U.S. PATENT DOCUMENTS

| | | | |
|---|---|---|---|
| Re. 25,065 | 10/1961 | Daley et al. | 62/48.1 |
| 1,652,929 | 12/1927 | Cawood | 251/351 |
| 1,897,161 | 2/1933 | Endacott | 137/78 |
| 1,968,141 | 7/1934 | Green | 137/78 |
| 2,229,081 | 1/1941 | Jansen et al. | 62/1 |
| 2,986,891 | 6/1961 | McMahon | 62/45 |
| 3,109,295 | 11/1963 | Stearns | 62/55 |
| 3,136,135 | 6/1964 | Rigby et al. | 62/53.2 |
| 3,269,133 | 8/1966 | Dixon | 62/51 |
| 3,319,431 | 5/1967 | Clarke et al. | 62/45 |
| 3,365,898 | 1/1968 | VanKleef | 62/240 |
| 3,418,822 | 12/1968 | Massey | 62/50.1 |
| 3,565,201 | 2/1971 | Petsinger | 123/527 |
| 3,577,739 | 5/1971 | Botkin | 62/45 |
| 3,677,021 | 7/1972 | Bognaes et al. | 62/55 |
| 3,898,853 | 8/1975 | Iung | 62/50.1 |
| 3,941,272 | 3/1976 | McLaughlin | 62/53.2 |
| 4,000,826 | 1/1977 | Rogers | 220/3 |
| 4,140,073 | 2/1979 | Androulakis | 62/53.2 |
| 4,320,627 | 3/1982 | Hvizdos | 62/54 |
| 4,608,830 | 9/1986 | Peschka et al. | 62/7 |
| 4,744,222 | 5/1988 | Murai | 62/49 |
| 4,846,126 | 7/1989 | Stannard | 123/294 |
| 4,977,747 | 12/1990 | Frejaville et al. | 62/50.1 |
| 4,987,932 | 1/1991 | Pierson | 141/1 |

(List continued on next page.)

FOREIGN PATENT DOCUMENTS

| | | | |
|---|---|---|---|
| 529741 | 12/1921 | France | 251/144 |
| 23408 | of 1909 | United Kingdom | 251/351 |

OTHER PUBLICATIONS

"LNG/CNG Facilities & Equipment," Hydra Rig, Jan. 1991.
"Quote M–2039," Hydra Rig, Jan. 1993.
"M60, 80 and 90 LPG Mixers," Algas Carburetion, Jan. 1991.
"DFC 400 Diesel Fumigation Systems," Algas Carburetion, Jan. 1991.
"M 500 LPG Fuel System," Algas Carburetion, Jan. 1993.
"M 500 CNG Fuel System," Algas Carburetion, Jan. 1992.
"Ecotrim CLC–1 Closed Loop Control," Algas Carburetion, Jan. 1992.

*Primary Examiner*—Willis R. Wolfe
*Attorney, Agent, or Firm*—Kenneth L. Nash

[57] ABSTRACT

A system is disclosed for handling, storing, transporting and dispensing cryogenic fluids, liquid natural gas, compressed natural gas, and their equivalents. A fuel injection system is disclosed for directly injecting LNG into an engine's combustion chamber. Such systems include a railroad system in which a container of fuel is carried on a flat car behind a locomotive and the, e.g. liquid natural gas, is conveyed to the locomotive with appropriate valves, conduits, pumps, and controls. In one aspect a fuel fluid, liquid, or vapor is injected into an intake (e.g., an air intake) of an engine. In one aspect a fueling station has been invented for providing services of dispensing LNG and/or CNG for engines.

20 Claims, 7 Drawing Sheets

402 401 405 408 410 409 404 406 407 411 405 403 414 413 412 407

U.S. PATENT DOCUMENTS

| | | | |
|---|---|---|---|
| 5,042,776 | 8/1991 | Chronister | 251/144 |
| 5,076,244 | 12/1991 | Donaldson | 123/527 |
| 5,107,906 | 4/1992 | Swenson et al. | 141/11 |
| 5,145,151 | 9/1992 | Chronister | 251/144 |
| 5,170,819 | 12/1992 | Chronister | 137/590.1 |
| 5,170,988 | 12/1992 | Chronister | 251/144 |
| 5,199,266 | 4/1993 | Johansen | 62/8 |
| 5,218,827 | 6/1993 | Pevzner | 62/50.6 |
| 5,228,295 | 7/1993 | Gustafson | 62/7 |
| 5,231,838 | 8/1993 | Cieslukowski | 123/527 |
| 5,261,746 | 11/1993 | Boasso | 366/276 |
| 5,263,329 | 11/1993 | Grove et al. | 62/50.16 |
| 5,263,824 | 11/1993 | Waldbeser et al. | 417/10 |
| 5,265,430 | 11/1993 | Chen et al. | 62/48.1 |
| 5,280,874 | 1/1994 | Zink et al. | 251/144 |
| 5,285,998 | 2/1994 | Zink et al. | 251/144 |
| 5,291,869 | 3/1994 | Bennett | 123/527 |
| 5,315,831 | 5/1994 | Goode et al. | 62/7 |
| 5,351,726 | 10/1994 | Diggins | 141/4 |
| 5,375,580 | 12/1994 | Stolz et al. | 123/527 |
| 5,421,161 | 6/1995 | Gustafson | 123/527 |
| 5,423,303 | 6/1995 | Bennett | 123/527 |
| 5,499,615 | 3/1996 | Lawrence et al. | 123/526 |
| 5,531,199 | 7/1996 | Bryant et al. | 123/527 |

90
106
92
101
102
98
A
96
99
94
118
103
97
104
91
116
105
112
114
95
115
113
117
109
110
108
108
107
121
111
119

120
127
123

125
126
124
122
128
129

134
130
131
132

NATURAL GAS FUELING SYSTEM

RELATED APPLICATION

This is a division of U.S. application Ser. No. 08/453,154 filed May 30, 1995 entitled "Fueling Systems," issued as U.S. Pat. No. 5,566,712 on Oct. 22, 1996, which is a continuation-in-part of U.S. application Ser. No. 08/158,023 filed on Nov. 26, 1993 entitled "Fuel Systems", now U.S. Pat. No. 5,441,234, issued on Aug. 15, 1995.

BACKGROUND OF THE INVENTION

1. Field of the Invention

This invention is related to natural gas fuel systems, including liquefied natural gas ("LNG") systems, compressed natural gas ("CNG") systems; gasoline and diesel fuel systems; and their equivalents; and, in one aspect, to handling, storing, moving, and dispensing such fuels and other hazardous materials. In certain particular aspects this invention is related to: internal tank valves; a method for direct injection of LNG into an engine combustion chamber; and container-type supported tanks with a supporting framework.

2. Description of Related Art

In response to air pollution, and other environmental damage, and health problems resulting from the use of gasoline, jet fuel, liquefied petroleum gas ("LPG") and diesel fuel in engines, LNG and CNG have been used as alternative fuels and engines have been developed which effectively utilize these cleaner burning fuels. Railroads, trucking and automobile fleets and maritime businesses are considering the conversion of their current engines so that they can use LNG or CNG. The prior art discloses tanks made of standard steel lined with up to a quarter of an inch of stainless steel or other corrosion-resistant and/or cold temperature-resistant material such as invar, titanium, monel, aluminum, or nickel steel.

In existing engines which use LNG as a fuel, the LNG is vaporized in a heat exchanger before it is combusted—either injected under high pressure (e.g. 2000 psig) into a combustion chamber or cylinder; or injected under low pressure into a carburetor. Certain existing systems for transporting and dispensing fuels such as gasoline and diesel and other hazardous liquids consist of railroad tank cars and over-the-highway tank trucks. Most such tanks have external valves which are easily damaged in accidents causing leaks and spills. There has long been a need for container type tanks with efficient and effective internal valves to provide a safer means of transportation of such liquids.

There has long been a need for an effective alternative fuel system. There has long been a need for such a system for efficiently handling, storing, transporting, dispensing and injecting fuels such as LNG and CNG. There has long been a need for safe and effective internal valves useful with containers of such fuels. There has long been a need for a system which provides convenient access to such fuels at a plurality of locations, including but not limited to remote locations and use with vehicles, trucks, railroads, ships and barges. There has long been a need for supported tanks with suitable frame supports for supporting and moving containers of such fuels.

SUMMARY OF THE PRESENT INVENTION

The present invention, in one embodiment, discloses an alternative fuel system for storing, handling, transporting, and dispensing fuels such as LNG, CNG, gasoline, diesel fuel, and their equivalents, and other hazardous materials. In one such system a structural framework including a series of interconnected structural steel beams encloses, protects, and supports fuel containers such as standard ISO ("ISO" means International Standards Organization) containers while providing access to various items, parts and valves on the containers. With such frame supports tanks can be stacked one on top of the other and they can be conveniently emplaced on rail cars, barges, trucks and in ships. Thus the containers may be used at a variety of locations as mobile storage tanks or storage tanks at fueling stations from which fuel may be dispensed on demand to vehicles or to other storage facilities. Preferably the tanks, in certain embodiments, have internally mounted valves according to the present invention to reduce spillage and increase the safety of fuel transfer from the tanks and of fuel transport in tanks.

According to certain embodiments of the present invention, a method and apparatus are provided for directly injecting LNG as a liquid into an engine's combustion chamber, e.g. into a diesel engine's cylinders or into a spark-ignited combustion chamber. In one such system LNG flows from a container tank, through a cryogenic hose to a sump on a pump. The pressure of the LNG is raised by the pump to a pressure suitable for injection and pumped to a manifold interconnected with the engine's cylinders. The fuel flows through electronically controlled cryogenic valves into the cylinders as liquid through cryogenic fuel injectors. Preferably all conduits, valves, and injectors through which the LNG flows are insulated.

In another embodiment rather than supply liquid natural gas to a manifold and control its flow to injectors, fluid fuel, liquid or vapor (e.g. methane, natural gas, LPG, CNG, etc.) is injected into an air or other engine intake (e.g. an air intake of an internal combustion or diesel engine).

Embodiments of fueling stations according to the present invention utilize tanks of LNG according to the present invention in combination with flow lines, meters, recycle compressors, and valves. In one aspect intermediate tanks may be used between tank(s) of LNG and CNG storage vessels to act as an accumulator. Such intermediate tanks are used in some prior art CNG processes.

Supported container tanks according to this invention may be placed on and/or secured to: a wheeled support such as a trailer, truck bed, or railroad car; or to a buoyant vessel such as a barge or ship. A plurality of such tanks may be stacked one on top of another.

Certain internal valves according to the present invention are useful with single-walled container tanks and others are useful with multi-walled tanks. In one such valve all parts may be installed or removed from outside a tank. This valve has a body with a threaded interior body channel therethrough and is mounted to an inner tank wall. A valve member is rotatably mounted to the body for movement toward and away from the tank. The valve member has one or more flow ports therethrough interconnected with a central flow channel through the valve member which is in fluid communication with the body channel. Upon rotation of the valve member toward the tank's interior, the valve member moves to expose the flow ports to the tank's contents, permitting fluid flow through the ports, through the body channel and to the tank's exterior. In one aspect the valve member is rotated by a threaded end of a nozzle apparatus which, in one embodiment has one or more arms extending outwardly therefrom to facilitate rotation of the nozzle to contact and then to rotate the valve member. The nozzle has a splined stinger which is received in corresponding spline recesses in the valve member so that rotation of the valve member in or out may be effected by the nozzle. In closing the valve the valve member is moved outwardly to again seat against the body member closing off fluid flow from the tank. At this point the nozzle is designed and configured so that the threaded nozzle end has exited from the threaded body channel and the splined stringer is removable from the valve member completely freeing the nozzle. The body has an outer end recessed from an exterior opening in the outer tank wall. A body mount is secured to the exterior tank wall for holding the outer end of the body. The nozzle has a threaded outer connection end to which a hose may be threadedly connected. Upon opening of the valve, fluid flows from the tank's interior, through the fluid ports, through the interior of the valve member, through the central channel of the stinger and nozzle end into an interconnected hose for dispensing. Seals suitable for cryogenic service are preferably used at the valve member-body interface; the body-exterior tank wall interface; and at the body-nozzle interface; and, if a hose is connected to the nozzle, at the hose-nozzle interface. Preferably suitable gaskets are provided where the body is mounted to the interior tank wall; where the body mount is secured to the exterior tank wall; and where a cover plate is removably mounted to the exterior tank wall over the valve access opening.

The previously-described valve may be used with a single-walled tank by omitting the body mount which is secured to the outer wall in a two-wall tank. In one such embodiment the body and valve member may be initially mounted externally of the tank interior. In such an embodiment a removable bonnet is, preferably, disposed over the valve.

In other embodiments of valves according to the present invention, the body has a portion extending into the tank having one or more fluid ports therethrough. The nozzle has a splined shaft which is movable within the body to contact, mate with, and rotate a valve member to a position interiorly of the body's fluid ports, opening them to fluid flow. The body of the nozzle itself also has flow slots therethrough so that, upon opening of the valve, fluid flows from the tank's interior, through the body's flow ports, through the nozzle's flow ports, through a central nozzle channel and out from the nozzle. One embodiment of this valve also may have the body mounted exteriorly of the tank.

In certain embodiments, tanks according to this invention have internal relief valves. In certain embodiments valves according to this invention have an excess flow sensor interconnected with an automatic valve shut-off device.

It is, therefore, an object of at least certain preferred embodiments of the present invention to provide:

- New, useful, unique, efficient, nonobvious systems and methods for using fuels such as LNG, CNG and their equivalents;
- Such systems with tanks having valves as described above which are accessible exteriorly of the tanks;
- Such systems utilizing tanks mounted in and supported by stackable protective frame supports which permit access to items such as valves on the tanks;
- Such systems which include the transport and storage of LNG and CNG to remote sites and the dispensing of fuels from mobile or stationary service stations and which facilitate the provision of fuel to vehicles, etc. and other storage facilities;
- Such systems with tanks with an internal relief valve or valves;
- Such systems with valves with an excess flow sensor interconnected with an automatic shut-off device;
- Such systems including the provision of LNG and CNG fuel from containers as described mounted to railcars for use in associated locomotive engines; and
- Methods and apparatus for direct injection of LNG into engines.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 3:
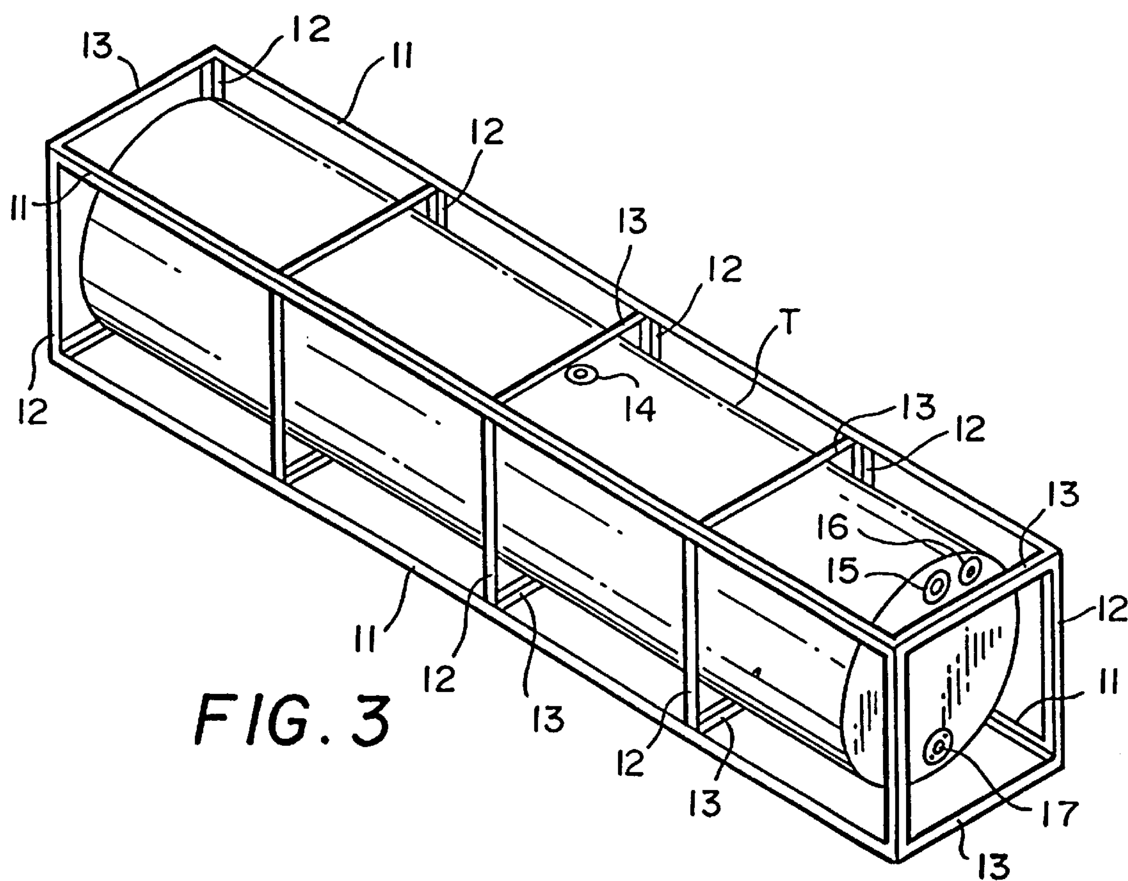
FIG. 3 is a perspective view of a tank and frame support according to the present invention.

Referring now to FIG. 3, a supported tank 10 according to the present invention has a tank T and a plurality of side beams 11 interconnected by vertical beams 12 and cross beams 13. The tank T rests on the bottom cross beams and contacts the other beams. The tank is, preferably, welded to the beams at multiple points.

In one embodiment the tank T is a standard size ISO tank. Openings between beams provide access to the various inlets, outlets, valves, controls, etc. on or associated with the tank T. As shown in FIG. 3, the tank T has a relief valve 14, a fill valve 15, a vapor return inlet 16, and an outlet valve 17. The beams may be made of any suitable materials, including but not limited to structural steel. The supports are, preferably, designed and configured so that they are stackable on one another.

Figure 4:
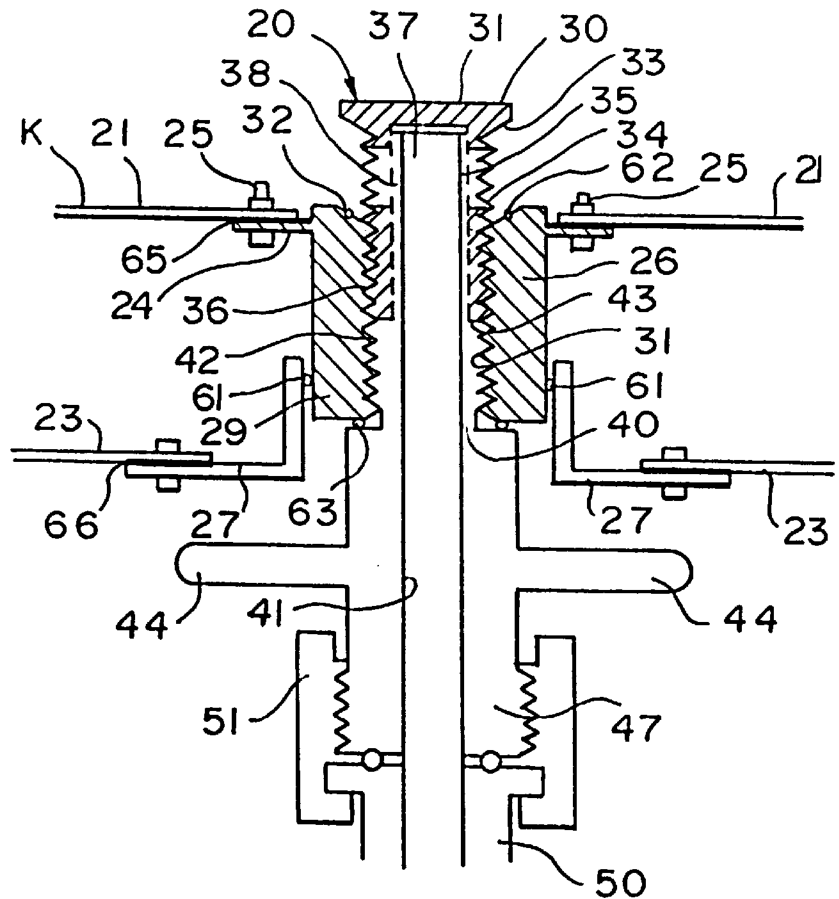
FIG. 4 is a side cross-sectional view of a valve according to the present invention.
Figure 5:
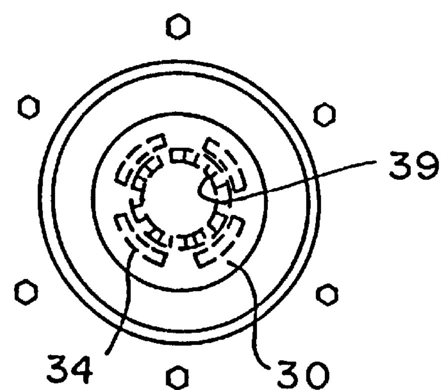
FIG. 5 is a top view of the valve of FIG. 4.
Figure 6:
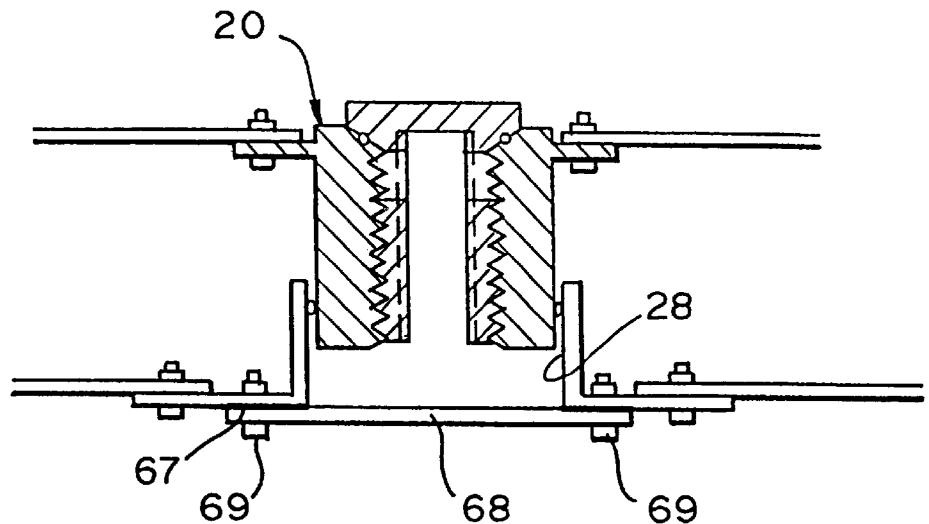
FIG. 6 is a side cross-sectional view of the valve of FIG. 4 closed.

As shown in FIGS. 4, 5, and 6, an internal valve 20 for a tank K has a valve body 26 with one end mounted to an internal tank wall 21 and with another end held in a mount member 22 which is secured to an exterior tank wall 23. The valve body has a flange 24 bolted to the wall 21 with bolts 25. The mount member 22 has a flange 27 bolted to the wall 23 and a mount support channel 28 in which a valve body end 29 is held. A valve member 30 is rotatably and threadedly mounted for movement in a corresponding threaded channel 31 which extends through the valve body 26. An end 31 of the valve member 30 has a surface 33 which seats against a seat 32 on the valve body 26 to close off the valve preventing fluid flow therethrough. A nozzle 40 has a splined end 37 with splines 38 which correspond to grooves 39 in the valve member 30 which receive the splines 38 so that rotation of the nozzle 40 rotates the valve member 30. An exteriorly threaded portion 42 of the nozzle 40 has a shoulder 43 which abuts an end 36 of the valve member 30. Turn bars 44 facilitate manual rotation of the nozzle 40. Removaly attached to the nozzle 40 exteriorly of the tank K is a cryogenic hose 50 with a threaded coupling 51 which sealingly mates with a threaded end 47 of the nozzle 40. An O-ring (preferably one designed for cryogenic service) seals the interface between the nozzle end 47 and the end of the hose 50. A fluid flows through the valve 20 by flowing through slots 34 in the valve member 30, into the interior of the valve member 30, through slots 35 in the nozzle 40, and into the interior channel 41 of the nozzle 40 for evacuation from the tank K.

An O-ring 61 seals the interface between the valve body 26 and the tank wall flange 27 and permits some expansion and contraction of the tank walls. A similar O-ring 62 (e.g. made of Teflon (TM)) seals the interface between the surface 33 and the seat 32 of the valve body 26. A O-ring 63 seals the interface between the nozzle 40 and the valve body 26. Insulation or a vacuum or both may be maintained between the tank walls. In one embodiment as shown the valve 20 is designed so that all parts may be installed or removed exteriorly of the tank K. A sealing gasket 65 is provided at the wall 21—flange 24 interface; a similar gasket 66 is provided at the wall 23—flange 27 interface.

As shown in FIG. 6, the valve 20 is closed with the valve member 30 seated against the valve body 26 and the nozzle 40 removed. A cover 68 is removably mounted over the channel 28 by bolts 69. A sealing gasket 67 seals the cover 68—flange 27 interface.

Figure 7:
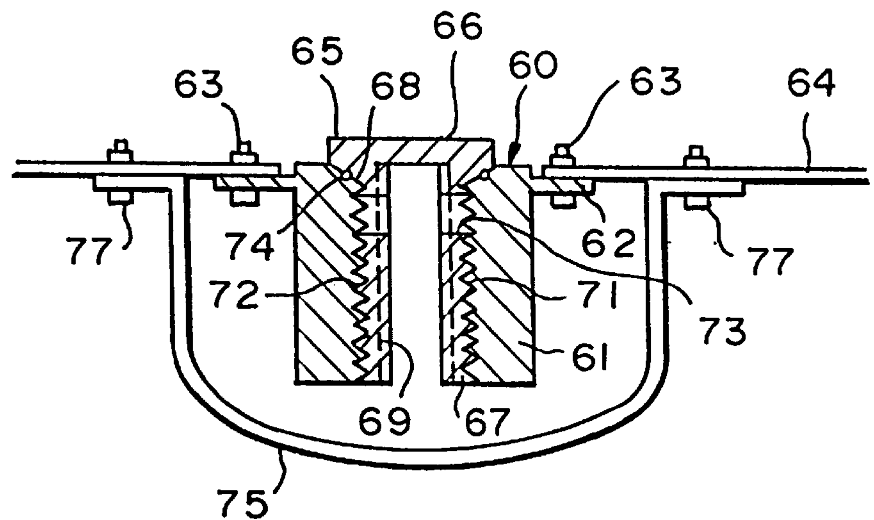
FIG. 7 is a side cross-sectional view of a valve according to the present invention on a single wall tank.

Referring now to FIG. 7, a valve 60 for a single-walled tank N has a valve body 61 mounted with a flange 62 mounted with bolts 63 to a tank wall 64. A valve member 65 with an end 66, an end 67, a seat surface 68 and a splined interior channel 69 (like that of the valve member 30) is movably mounted with exterior threads 71 in a threaded interior channel 72 of the valve body 61. A nozzle like the nozzle 40 is used to open and close the valve. The valve member 65 has flow slots 73 like the flow slots in the valve member 30. A sealing O-ring 74 seals the valve member—valve body interface. An enclosing bonnet 75 has a flange 76 which blocks flow through the valve 60 and is removably secured to the tank wall 64 with bolts 77.

Figure 8:
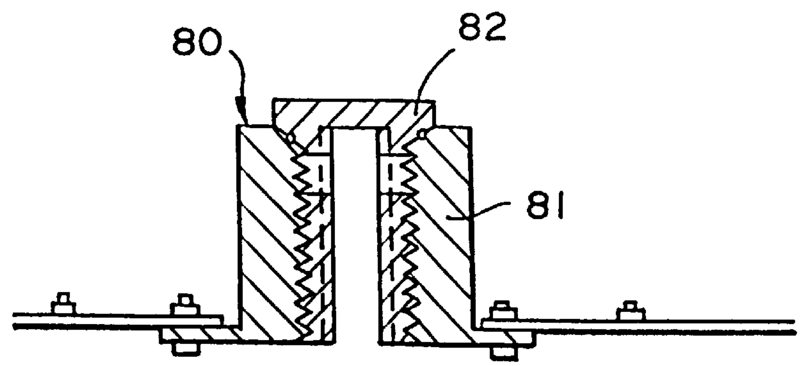
FIG. 8 is a side cross-sectional view of an alternate embodiment of the valve of FIG. 7.

Referring now to FIG. 8 a valve 80 (like the valve 60) has its valve body 81 and valve member 82 mounted interiorly of the tank N. A cover (like the cover 68) may be used with the valve 80.

Figure 9:
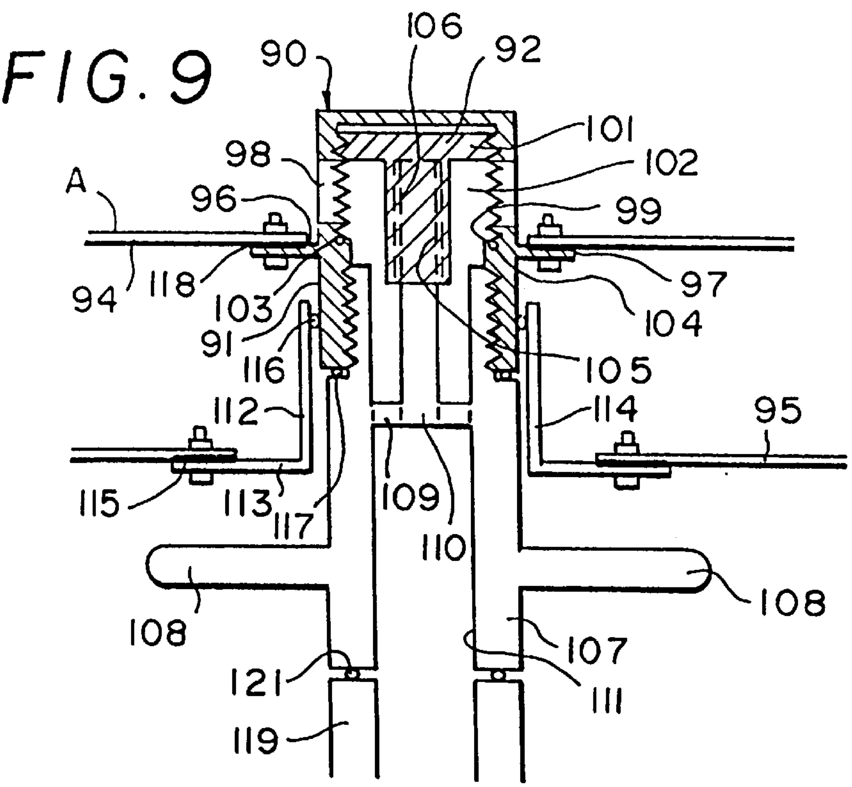
FIG. 9 is a side cross-sectional view of a valve according to the present invention.

Referring now to FIG. 9, an internal valve 90 according to the present invention for a double-walled tank A has a valve body 91 and a valve member 92. A nozzle 107 is used with the valve 90. The tank A has an interior wall 94 and an exterior wall 95. The valve body 91 extends through an opening 96 in the wall 94 into the tank A. A flange 97 of the valve body 91 is bolted to the wall 94. Fluid flows through slots 98 into an interior threaded channel 99 of the valve body 91.

The valve member 92 has a threaded end 101 and is movably mounted in the threaded channel 99 of the valve body 91. The threaded end 101 has a lower surface 102 which seats against an interior shoulder 103 of the valve body 91 closing off flow through the valve. A sealing O-ring 104 seals the valve member—valve body interface. The valve member 92 has an internal splined channel 105 for receiving a splined end 106 of a nozzle 107. The nozzle 107 has turn bars 108 for manually rotating the nozzle and hence the valve member 92. When the valve member 92 is positioned as shown in FIG. 9, fluid flows through the slots 98 in the valve member 92, into the interior channel 99 of the valve body 91, to and through slots 109 in an interior member 110 of the nozzle 107 and then into an interior channel 111 of the nozzle 107 for evacuation from the tank A. A mount member 112 has a flange 113 removably bolted to the wall 95 and a mount support channel 114 holds an end of the valve body 91. A gasket 115 seals the wall 95—mount member 112 interface and a sealing O-ring 116 seals the channel 114—valve body 91 interface. A sealing O-ring 117 seals the nozzle 107—valve body 91 interface. A gasket 118 seals the wall 94—flange 97 interface. A cryogenic hose 119 is sealingly connected to the nozzle 107 e.g. by a coupling (not shown—like the coupling in FIG. 4). An O-ring 121 seals the nozzle—hose interface. A cover such as the cover 68 may be used with the valve 90.

Figure 10:
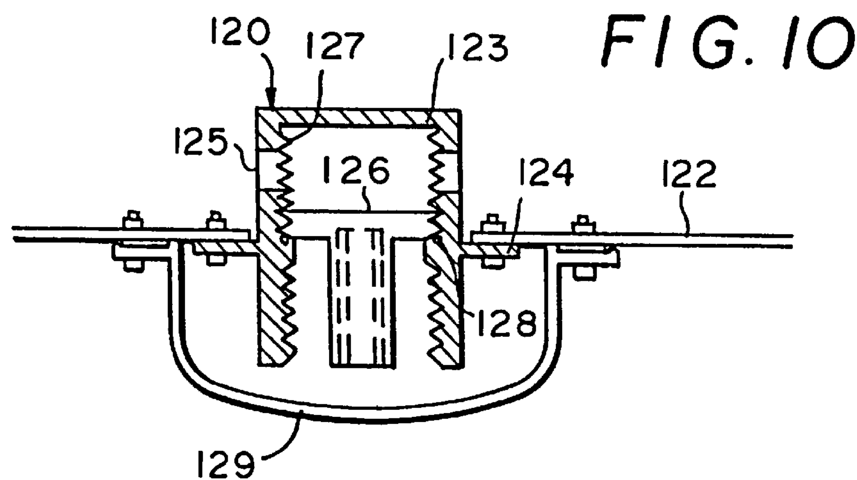
FIG. 10 is a side cross-sectional view of a valve according to the present invention on a single wall tank.

FIG. 10 shows a valve 120 like the valve 90, but used with a tank T which has a single wall 122. A valve body 123 (like the valve body 91) with flow slots 125 has a flange 124 bolted to the wall 122. A valve member 126 (like the valve member 92) is movably positioned in an interior threaded channel 127 of the valve body 123. As shown the valve member 126 is sealingly seated against an inner shoulder 128 of the valve body 123 and flow through the valve is not permitted. An enclosing bonnet 129 removably secured to the tank wall prevents flow through the valve.

Figure 11:
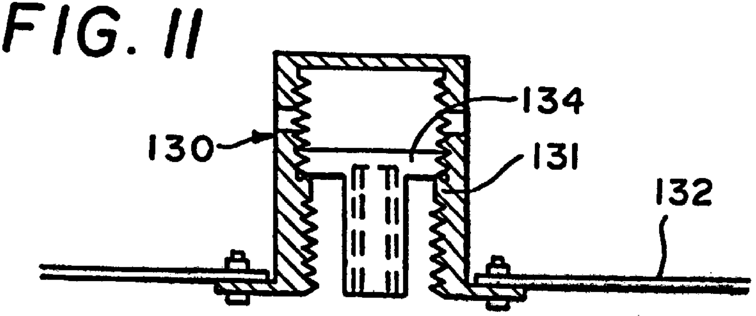
FIG. 11 is a side cross-sectional view of a valve according to the present invention.

Referring now to FIG. 11 an alternative embodiment of the valve 120 is shown. A valve 130 shown in FIG. 11 has a valve body 131 the majority of which is disposed within a single-walled tank T having a wall 132. Bolts 133 bolt the valve body 131 to the wall 132. The valve 130 has a movable valve member 134 like the valve member 126 of the valve 120. A cover like the cover 68 may be used with the valve 130.

Figure 1:
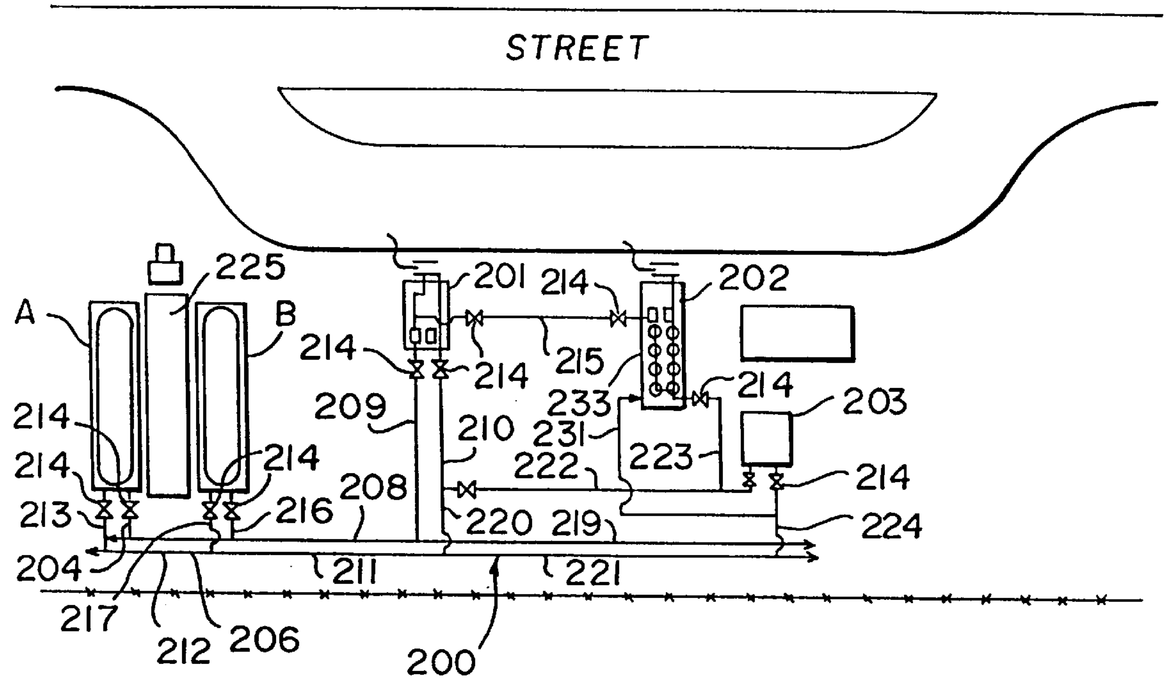
FIG. 1 is a schematic view of a fueling station according to the present invention.

FIG. 1 illustrates a fueling station 200 according to the present invention which employs one or more of the supported tanks A and B (like the tank 10, FIG. 1) which contain LNG. Each tank is selectively interconnected via flow lines with an LNG meter 201 and a CNG meter 202. A recycle compressor 203 provides needed repressurization of the CNG vessels 233 or vapor return to the LNG tanks A and B through line 223 from the CNG storage vessels 233 to the compressor 203 and line 224 from the compressor 203's discharge back to the CNG storage vessels 233.

LNG in tank A flows via lines 204, 206, 208, and 209 to the LNG meter 201 from which it can be supplied to other tanks or to engines on vehicles or ships. Vapor can be returned to the tank A or B from the LNG meter 201 via lines 210–213. Valves 214 control flow in various lines.

Flow line 215 between the LNG meter 201 and the CNG vessels 233 provides for flowing LNG to the CNG vessels 233 to repressure them when needed. The prior art discloses methods for converting LNG to CNG.

The recycle compressor 203 is interconnected with both tanks A and B via lines 224, 221, 211, 212, 213; and 222, 220, 211, 217 and with the CNG storage vessels 233 via a line 224. Flow occurs similarly from and to tank B via lines 216 and 217. The recycle compressor communicates with the CNG storage vessels 233 via a line 231.

A truck 225 is shown positioned adjacent the tanks A and B to illustrate the portability of the tanks and show space for tank unloading. The system of FIG. 1 to supply fuel, e.g. LNG or CNG, may be skid-mounted and moved to remote locations as desired and needed.

Appropriate and commercially available connections, hoses, valves, pumps, vaporizers, and storage bottles, are used with the system of FIG. 1.

LNG may be converted to CNG by conventional pumping and warming apparatus for use in the system of FIG. 1. A system as shown in FIG. 1 in one alternative embodiment, may be disposed adjacent to a body of water, and either supply tanks or tanks to be filled or both may be presented on ships, barges, etc.; or the system may be located adjacent a railroad to either supply rail-mounted tanks or be filled from them.

Figure 2:
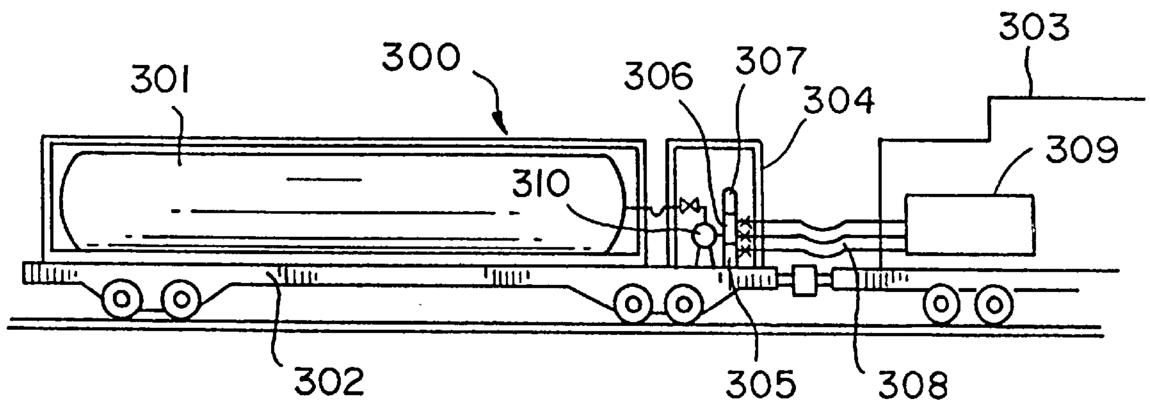
FIG. 2 is a schematic view of a railroad system according to the present invention.

FIG. 2 illustrates a system 300 according to the present invention for supplying LNG to a railroad locomotive. An LNG container tank 301, preferably like the tank 10, is removably disposed on a railroad flatcar 302 which is linked to and pulled behind a railroad locomotive 303. A removable skid frame 304 secured to the flatcar 302 supports a control system which includes one or more pumps 310, meters 305, controls 306, and vaporizers 307. Hoses 308 interconnect the tank 301 and an engine 309 of the locomotive. In a typical sequence of operation of the system 300 LNG is pumped up to the required engine fuel pressure, vaporized, metered, and flows to the engine.

Figure 12:
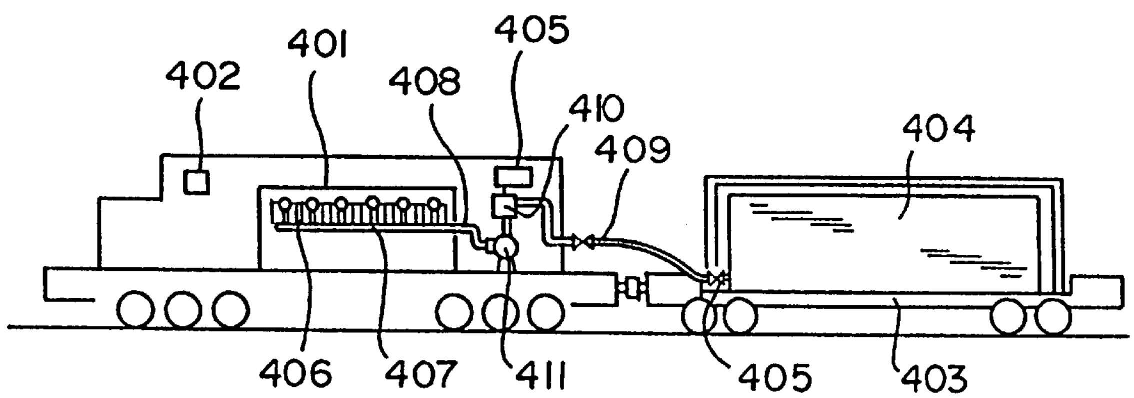
FIG. 12 is a schematic view of a rail system according to the present invention with direct LNG injection according to the present invention.

FIG. 12 illustrates a system 400 according to the present invention for the direct injection of LNG into an engine 401 of a railroad locomotive 402. A flatcar 403 is like the flatcar 302 and supports a tank 404 like the tank 301. Liquid LNG is supplied to combustion chambers 406 of the engine 401 via a manifold 407 and a flow line 408. LNG flows through a cryogenic hose 409 from the tank 404 to a sump 410 mounted above an LNG pump 411. The pressure of the LNG is changed by the pump 411 to a desired injection pressure (e.g. 2000 p.s.i.g.) which is maintained in the flow line 408 and the manifold 407. This system may be used, e.g. with any internal combustion engine.

Figure 13:
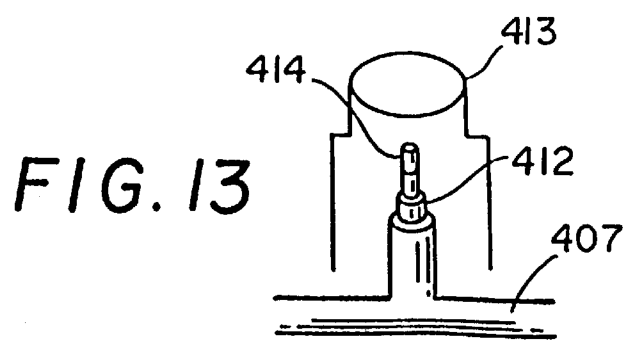
FIG. 13 is a detailed view of injection apparatus of the engine of FIG. 12.

As shown in FIG. 13 an electronically controlled valve 412 admits liquid LNG into a cylinder 413 of the engine 401 through an injector 414. Preferably all conduits, pipes, and vessels with LNG therein are jacketed and insulated. The injection of liquid LNG at a relatively cold temperature (e.g.—260 degrees F.) into a hot engine cylinder results in a cooling down, e.g. by about 60 to 300 degrees F, of the fuel-air charge, producing a lower combustion temperature and resulting in the formation of less undesirable nitrous oxide, pollutants, and/or other hazardous materials. LNG vaporizes in the hot engine cylinders, thus such vaporization need not be accomplished by heat exchangers in certain embodiments of this invention. The LNG may be injected into the cylinder at a desired point in the piston stroke.

The systems and apparatuses described herein with respect to LNG and/or CNG may be used with equivalents of these substances, particularly with cryogenic liquids. The tanks and valves disclosed herein may be used with non-cryogenic liquids which are hazardous. The internal valves according to this invention disclosed herein may be used with prior art tanks or with tanks as disclosed herein according to this invention.

Figure 14:
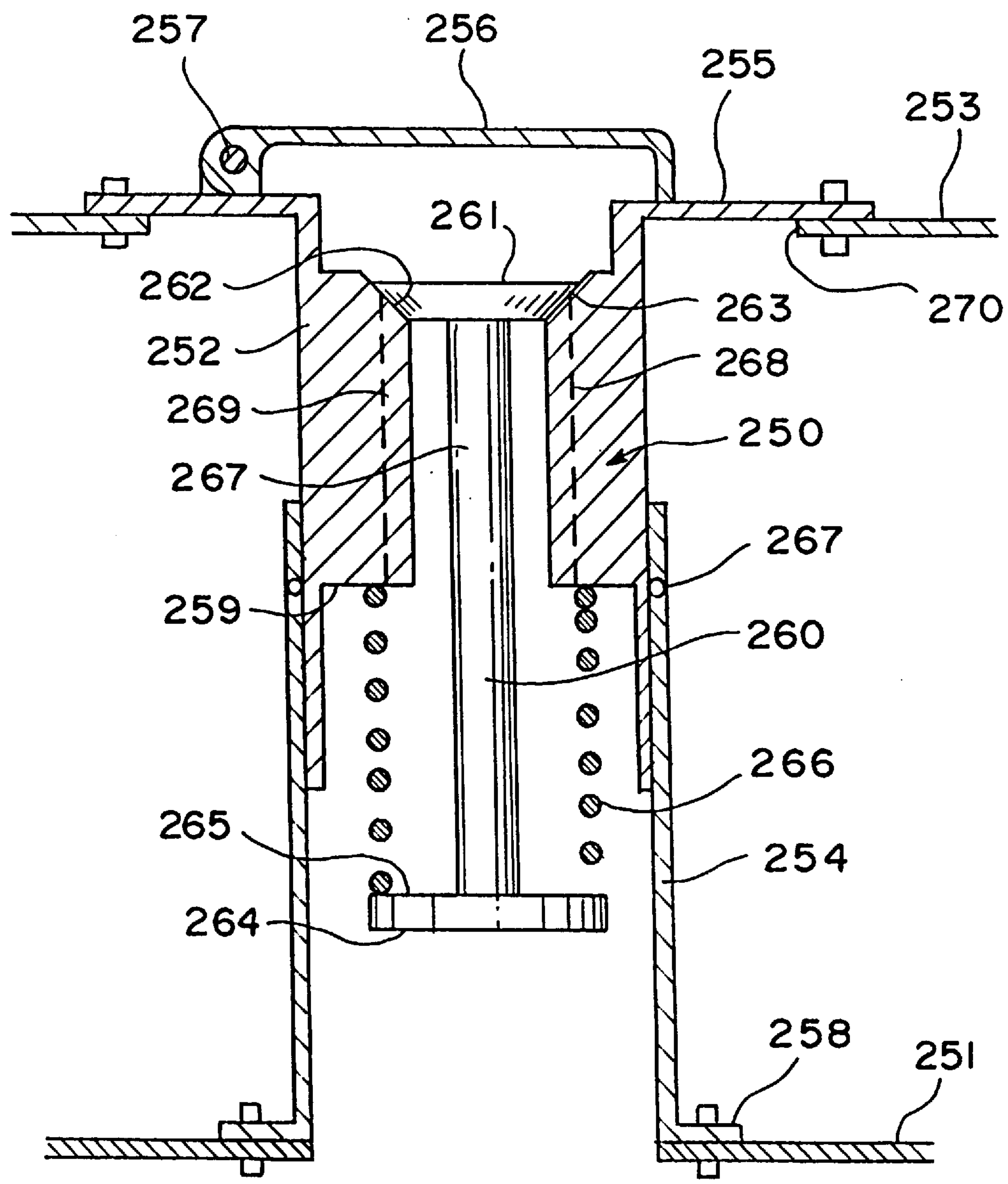
FIG. 14 is a side cross-section view of a pressure relief valve according to the present invention.

FIG. 14 illustrates an internal pressure relief valve 250 which is designed, positioned, and configured to relieve pressure on a tank, e.g. a tank carrying hazardous material or cryogenic liquid (including, but not limited to, any tank disclosed, described, or claimed herein). The valve 250 has a top mount member 252 with a flange 255 bolted to an outer tank wall 253. A solid rain cap 256 is connected with a hinge mechanism to the flange 255. The rain cap 256 is movable to provide access to the interior of the top mount member 252 and items therein.

A valve member 260 is movably disposed in the top mount member 252 and in a bottom mount member 254 which has a flange 258 bolted to an inner tank wall 251. A top 261 of the valve member 260 has a sealing surface 262 which is movable to contact and seal against a sealing surface 263 of the top mount member 252. A spring 266 abutting a lower shoulder 259 of the top mount member 252 and a shoulder 265 of a bottom member 264 of the valve member 260 urges the top 261 of the valve member 260 sealingly against the sealing surface 263 of the top mount member 252. A shaft 267 connects the top 261 and the bottom member 264. An O-ring seal 267 seals an interface between an exterior surface of the top mount member 252 and an interior surface of the bottom mount member 254. Two slots 268 in the top mount member 252 receive two corresponding ribs 269 to guide movement of the valve member 260. The ribs 269 slide in the slots 268 when the valve member 260 moves.

In one preferred embodiment of the valve 250 an opening 270 in the outer tank wall 253 is large enough so that the entire assembly of the valve is removable through or installable through the opening. In one aspect the spring 266 is selected to have a spring force which is about 10% above the force of the maximum allowable operating pressure (or "MAOP") of the tank. By permitting the top mount member 252 to have some freedom of movement with respect to the bottom mount member 254, the assembly is not adversely affected by contraction and/or expansion of the tank wall(s). The O-ring seal 267 prevents fluid leakage at the interface of the mount members, including during movement of the mount members with respect to each other. The valve 250 may be used with a single wall tank (with the bottom mount member deleted). Valves 250 are shown schematically on the tanks in FIGS. 1 and 2.

Figure 15:
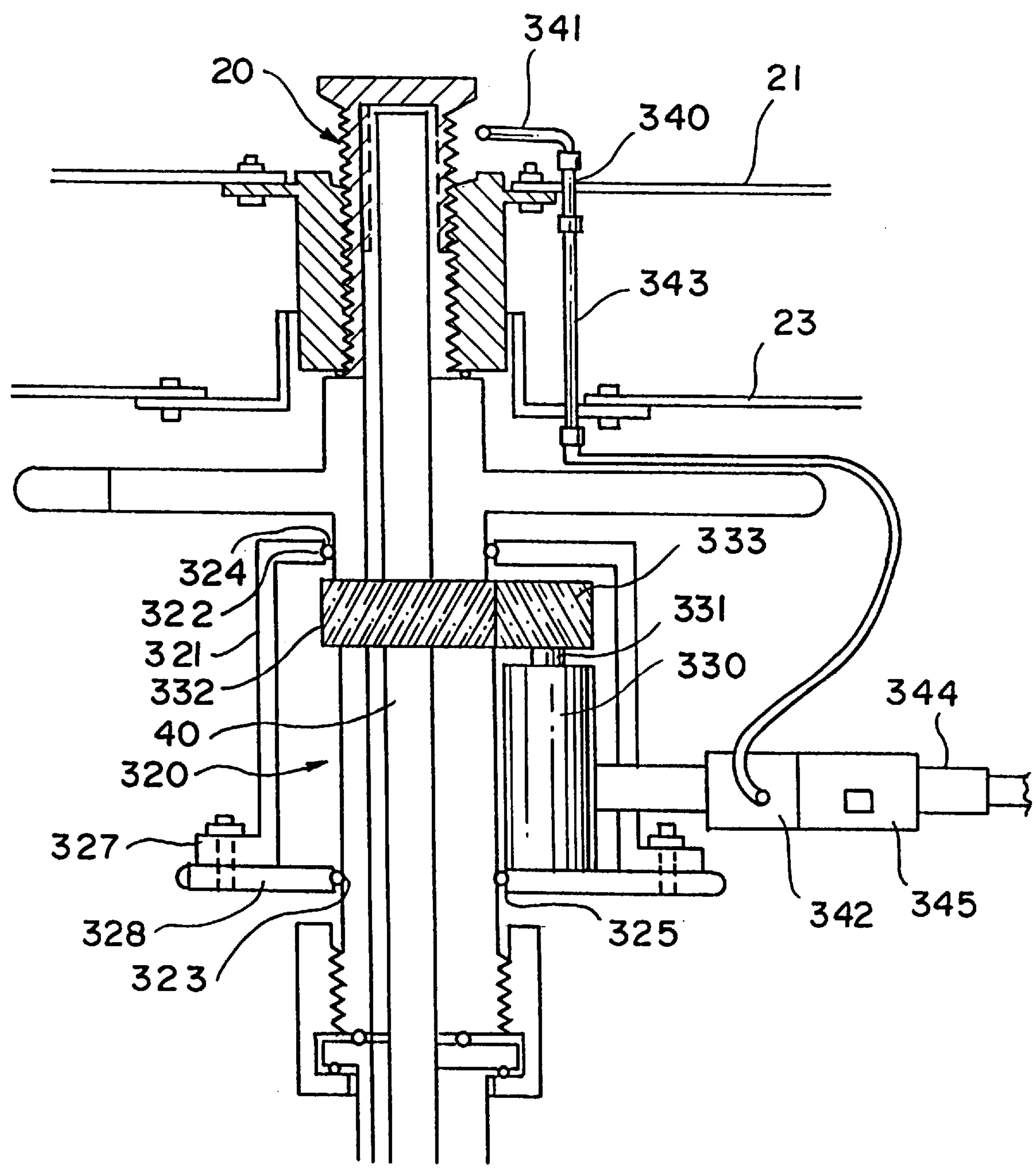
FIG. 15 is a side cross-section view of a valve with automatic closing device according to the present invention.

FIG. 15 shows a valve 20 (as previously described) with a shut-off device 320 which will close the valve 20 in the event of excessive flow through the valve 20 (caused, e.g. by a break in the system anywhere downstream of the valve). The device 320 has a housing 321 secured about the nozzle 40. O-rings 322 and 323 seal the interface of an exterior surface of the nozzle 40 and openings 324 and 325, respectively, of the housing 321. A flange 327 of a top part 326 of the housing 321 is bolted to a bottom part 328 of the housing 321. A motor 330 mounted in the housing 321 has a shaft 331 to which is attached a drive gear 333 which meshes with and drives a driven gear 332 to close the valve. The driven gear 332 is around the nozzle 40 so that rotation of the motor's shaft 331 effects rotation of the nozzle 40 to close the valve 20.

The flow rate of fluid through the valve 20 is sensed by a pitot tube sensor 340 which includes a pitot tube 341 interconnected by a flow line 343 to an electric solenoid valve 342. When the solenoid valve 342 is opened in response to excessive fluid flow, motive fluid (e.g. air or hydraulic fluid under pressure) is admitted to the motor 330. The motor 330 then turns the shaft 331 to close the valve 20. The flow of motive fluid to the solenoid valve 342 through a hose 344 is controlled by a switch 345. The device 320 may be used with any valve disclosed, described, or claimed herein and is shown schematically on valves 20 in FIGS. 1 and 2.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the reinvention as broadly as legally possible in whatever form its principles may be utilized.

What is claimed is:

1. An apparatus for injection into an engine, said engine having at least one power cylinder and being used for motive power of a transport vehicle, said apparatus comprising:

an injector body securable to said engine and having a passageway therethrough, said passageway being in communication with said at least one power cylinder;

a tank vessel having an interior said tank vessel being suitable for storing liquefied natural gas consisting primarily of methane at a temperature of −258° F. or less;

an outer structure containing said tank vessel and being securely affixed thereto, said outer structure and said tank vessel being removable from said transport vehicle to allow replacement of an empty tank vessel with a full tank vessel; and a flow path connecting between said interior of said tank vessel and said injector body.

2. An apparatus for direct injection into an engine, said engine having at least one power cylinder, said apparatus comprising:

an injector body securable to said engine and having a passageway therethrough, said passageway being configured for direct communication with said at least one power cylinder;

an insulated feed line connectable with said injector body operable for supplying liquid natural gas having a temperature of −258° F. or less so as to be injectable in a liquid state into said at least one power cylinder through said injector body; and a tank vessel having an interior, said tank vessel being suitable for storing said liquid natural gas having a temperature of −258° F. or less.

3. The apparatus of claim 2, further comprising:

a control valve in fluid communication with said insulated feed line.

4. The apparatus of claim 2, further comprising:

a plurality of beams secured to said tank vessel for supporting said tank vessel, said beams being slidably removable with respect to a mounting surface.

5. The apparatus of claim 2, further comprising:

a skid mounting secured to said tank vessel.

6. The apparatus of claim 2, further comprising:

a tank vessel support structure secured to said tank vessel, said support structure being stackable with respect to a second substantially identical tank vessel support structure.

7. The apparatus of claim 2, wherein said tank vessel is also suitable for storing a non-cryogenic flowable substance.

8. A method for direct injection of liquid natural gas as liquid having a temperature of approximately −258° F. or less into an engine, the engine having a plurality of power cylinders, each power cylinder having an injector for injecting liquid natural gas into the cylinder and a control valve controlling flow of liquid natural gas to the injector, the method comprising:

supplying liquid natural gas to each control valve, controllably flowing liquid natural gas through each control valve to a corresponding injector, and injecting liquid natural gas having a temperature of −258° F. or less through the injectors into the power cylinders, said liquid natural gas being in a liquid state as it is flowing through the injectors.

9. The method of claim 8 wherein a mainfold is in fluid communication with each control valve, and the method further comprising supplying liquid natural gas to each control valve by supplying liquid natural gas to the manifold from which it flows to each control valve.

10. The method of claim 8 wherein the engine has an air intake in fluid communication with the power cylinders of the engine, the method further comprising supplying liquid natural gas into the air intake of the engine for flow into the power cylinders.

11. The method of claim 8 wherein the liquid natural gas is injected into the engine at a temperature sufficiently low to cool the engine by about 60 degrees F to 300 degrees F to produce a lower engine fuel combustion temperature thereby inhibiting formation of pollutants by the engine.

12. The method of claim 8 further comprising controlling each control valve electronically, and storing liquid natural gas to be supplied to the injectors in a supported cryogenic tank adjacent the engine.

13. The method of claim 12 wherein the engine is a railway locomotive engine of a railway locomotive and the supported cryogenic tank is disposed on a car connected to the locomotive.

14. The method of claim 8 wherein the supported cryogenic tank comprises a hollow tank vessel having an interior and suitable for receiving and storing a cryogenic liquid fuel, a support frame encompassing the tank vessel, the frame comprising longitudinal beams extending along a length of the tank vessel and welded thereto, vertical beams interconnected between the longitudinal beams and welded thereto and to the tank vessel, horizontal beams interconnected between the longitudinal beams and welded thereto and to the tank vessel, the beams spaced apart to permit access to the tank vessel and to apparatuses thereon, and a relief valve mounted on the tank for relieving pressure in the tank when it reaches a certain pre-set level, the relief valve accessible from an exterior of the tank, the liquid fuel flowable from the interior of the hollow tank vessel, through the relief valve, and to outside the tank, the method further comprising relieving pressure in the supported cryogenic tank.

15. The method of claim 14 wherein the relief valve relieves pressure in the supported cryogenic tank when pressure therein exceeds by about 10% of a maximum allowable operating pressure of the supported cryogenic tank.

16. The method of claim 14 wherein the relief valve of supported cryogenic tank is an internal relief valve mounted within the tank and accessible from an exterior of the tank.

17. The method of claim 16 wherein the supported cryogenic tank has an inner wall and an outer wall spaced apart from the inner wall, the internal relief valve mounted between the inner wall and the outer wall, the internal relief valve having a top mount member secured to the outer wall and a bottom mount member secured to the inner wall, and the top mount member movable with respect to the bottom mount member.

18. The method of claim 17 wherein the internal relief valve further comprises a body member with a central channel therethrough and a body flange therearound, the body flange secured about an opening in the wall of the cryogenic tank with the body member extending into the tank, and a valve member within the tank movably disposed in the body member, at least one flow slot through the body member through which a fluid in the tank may flow to the central channel of the body member and out from the tank, the valve member movable back and forth in the central channel of the body member within the tank to selectively permit or prevent flow through the at least one flow slot to the central channel.

19. The method of claim 6 wherein the internal relief valve further comprises a body member with a central channel therethrough and a body flange therearound, the body flange secured about an opening in the inner wall of the cryogenic tank, the body member extending into a space between the inner wall and the outer wall, and a valve member within the tank and movably disposed in the body member, the valve member having at least one flow slot therethrough through which a fluid in the tank may flow to the central channel of the body member and out from the tank, the valve member movable back and forth within the tank in the central channel of the body member to selectively permit or prevent flow through the at least one flow slot to the central channel.

20. The method of claim 17 wherein the internal relief valve further comprises the valve member having a valve disc within the tank which extends across the central channel of the body member, the valve member having a rod extending outwardly from the valve disc, the rod having a recess therein, the valve disc movable with the body member to effect a seal within the tank to close off fluid flow through the central channel, nozzle apparatus movably receivable in the central channel of the body member to contact and move the valve member, the nozzle apparatus having a central fluid passage therethrough and at least one flow slot therethrough, for fluid to flow through the valve member and out from the tank through the nozzle apparatus, and the nozzle apparatus having a nozzle rod extending from the central block for reception in the recess of the rod of the valve member, the recess of the rod holding the nozzle rod so that rotation of the nozzle apparatus rotates the valve member.

* * * * *